United States Patent
Jury et al.

(10) Patent No.: US 10,248,924 B2
(45) Date of Patent: Apr. 2, 2019

(54) NETWORK CHANGE AUDITING SYSTEM

(71) Applicant: QUEST SOFTWARE INC., Aliso Viejo, CA (US)

(72) Inventors: Derek Alfred Jury, Beechville (CA); Sohail Ali, Halifax (CA); Jake Seigel, Halifax (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 639 days.

(21) Appl. No.: 15/040,793

(22) Filed: Feb. 10, 2016

(65) Prior Publication Data
US 2017/0228673 A1    Aug. 10, 2017

(51) Int. Cl.
| H04L 29/06 | (2006.01) |
| G06Q 10/06 | (2012.01) |
| G06Q 10/10 | (2012.01) |
| H04L 12/815 | (2013.01) |

(52) U.S. Cl.
CPC ......... *G06Q 10/0633* (2013.01); *G06Q 10/10* (2013.01); *H04L 47/22* (2013.01)

(58) Field of Classification Search
CPC ...................................................... H04L 67/22
See application file for complete search history.

(56) References Cited

U.S. PATENT DOCUMENTS

2017/0311278 A1\* 10/2017 Adjakple ............... H04W 60/00
2018/0225795 A1\*  8/2018 Napoli ............. G06Q 10/06316

OTHER PUBLICATIONS

"Products: PowerBroker Auditor for Active Directory—BeyondTrust, AD Change and Control and Compliance Reporting PowerBroker Auditor for Active Directory," 1999-2016, pp. 1-13, Beyond Trust, Inc., http://www.beyondtrust.com/Products/PowerBrokerAuditorAD/.

"Complete Visibility of Your Active Directory, #Completevisibility of Your Active Directory Introducing Netwrix Auditor for Active Directory," 2015, pp. 1-3, Netwrix Corporation, http://www.netwrix.com/complete_visibility_of_active_directory.html.

\* cited by examiner

*Primary Examiner* — Adnan M Mirza
(74) *Attorney, Agent, or Firm* — Maschoff Brennan

(57) ABSTRACT

A network includes a workflow management system coupled to an administrator device, and servers coupled to a user device. A network change auditing system receives and stores workflow definitions from the workflow management system that are associated with respective workflows provided by the servers. The network change auditing system receives and stores activity events from the servers that are associated with instructions from user devices to the servers. The network change auditing system associates a first subset of the activity events with a first workflow based on the first subset of the activity events being defined by a first workflow definition. The network change auditing system receives an identification of a first activity event from an administrator device and, in response, provides an identification of the first workflow and at least one second activity event in the first subset of the activity events for display on the administrator device.

17 Claims, 10 Drawing Sheets

NETWORK CHANGE AUDITING SYSTEM

BACKGROUND

The present disclosure relates generally to information handling systems, and more particularly to auditing changes in a network of information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and user devices, are often coupled together in networks such as, for example, local area network (LANs), in order to allow for management and control of those server devices while allowing the user devices to utilize the server devices to perform a variety of network functions known in the art. It is sometimes desirable to audit changes occurring in such networks, and the auditing of such data can raise a number of issues. For example, the utilization of the server devices by the user devices in the network can generate relatively large amounts of data (e.g., millions of network events may be identified and recorded), which can make it very difficult to investigate why any given change or changes have occurred in the network. Furthermore, the operations of running reports on the collected data and filtering through the information provided in those reports to identify changes of interest is a time consuming, tedious task that is associated with relatively large productivity losses for network administrators that may be searching for a source, reason, or other information about an event or change that has occurred in the network. As such, finding answers to questions such as why a network change occurred, whether the network change was planned, and/or other information about changes in a network, along with the associated time necessary to determine such answers, often prevents networks administrators from understanding critical information about their network that could be used to manage the network better.

Accordingly, it would be desirable to provide an improved network change auditing system.

SUMMARY

According to one embodiment, a network change auditing system includes a communication system that is coupled to a plurality of servers; a database storing a plurality of workflow definitions that are each associated with a respective workflow provided by at least one of the plurality of servers; a processing system coupled to the database; and a memory system that is coupled to the processing system and the communication system, wherein the memory system includes instructions that, when executed by the processing system, cause the processing system to provide a contextual grouping correlation engine that is configured to: receive and store a plurality of activity events from the at least one of the plurality of servers through the communication system, where each activity event is associated with instructions provided by at least one user device to at least one of the plurality of servers; associate a first subset of the plurality of activity events with a first workflow based on the first subset of the plurality of activity events being defined by a first workflow definition of the plurality of workflow definitions; and receive an identification of a first activity event in the first subset of the plurality of activity events from an administrator device through the communication system and, in response, provide an identification of the first workflow and at least one second activity event in the first subset of the plurality of activity events through the communication system for display on the administrator device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
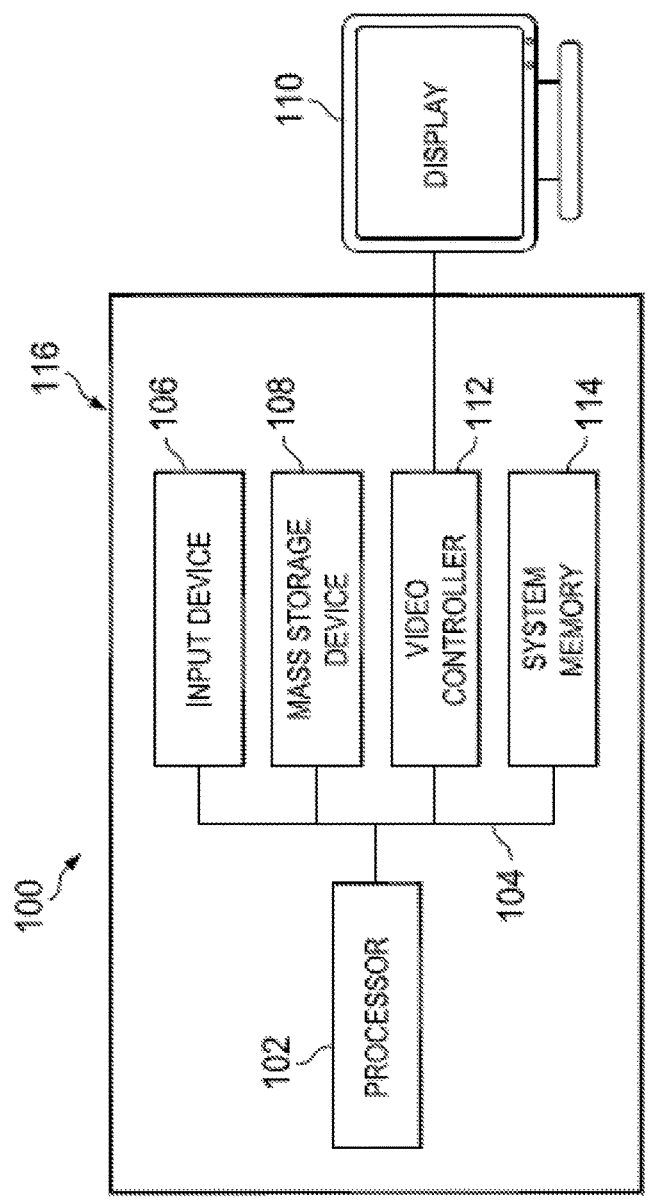
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
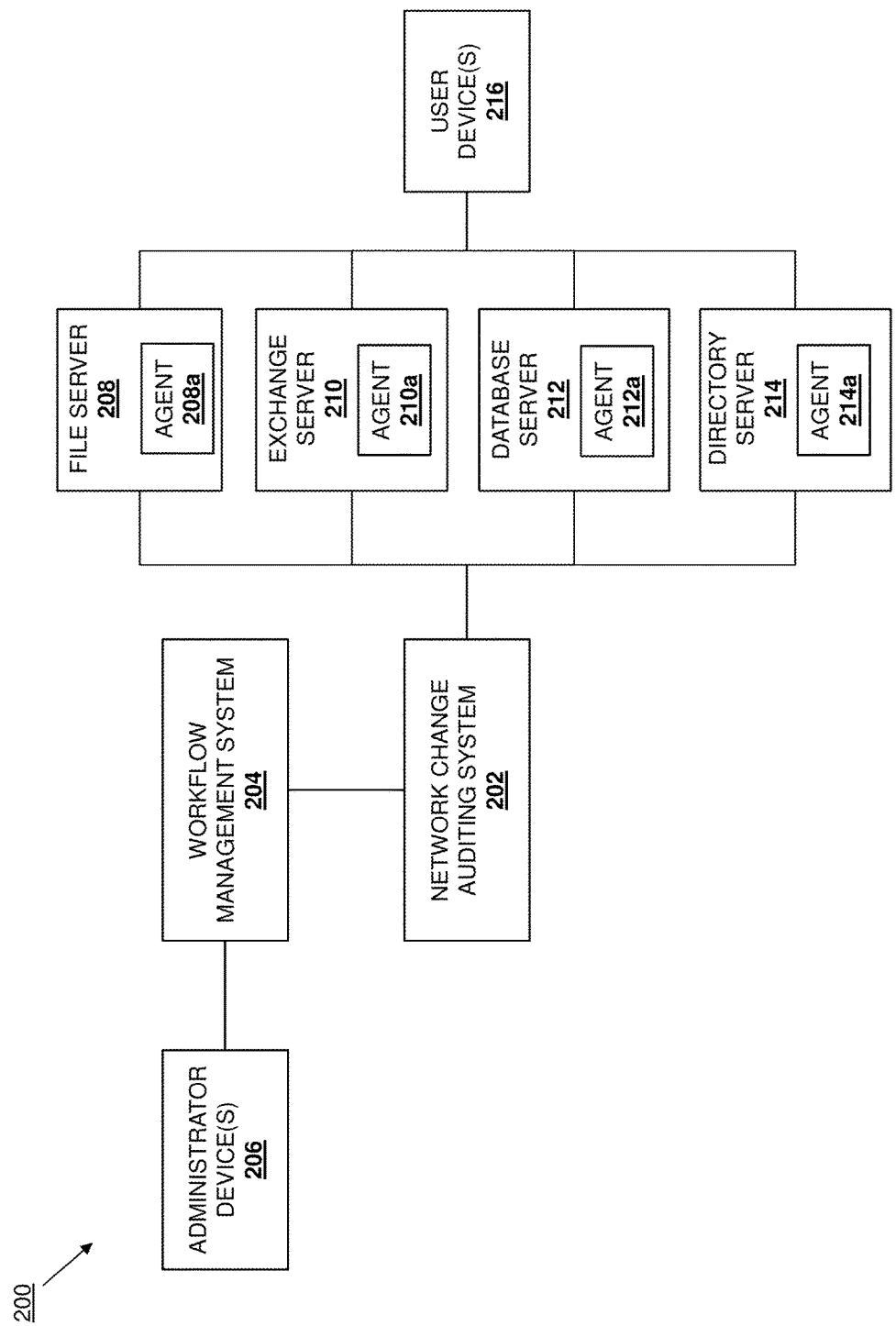
FIG. 2 is a schematic view illustrating an embodiment of a network.

Referring now to FIG. 2, an embodiment of an IHS network 200 is illustrated. The IHS network 200 includes a network change auditing system 202 that, in an embodiment, may be the IHS 100 discussed above with reference to FIG. 1 and/or may include some or all of the components on the IHS 100. In a specific example, the network change auditing system 202 is provided by one or more servers (e.g., a network change auditing server and a network change auditing database server) that are configured to perform the functions of the network change auditing systems discussed below. The network change auditing system 202 is coupled to a workflow management system 204 that, in an embodiment, may be the IHS 100 discussed above with reference to FIG. 1 and/or may include some or all of the components on the IHS 100. In a specific example, the workflow management system 204 is provided by one or more servers (e.g., a workflow management server such as, for example, a Team Foundation Server (TFS) available from MICROSOFT® of Redmond, Wash., United States; a server running JIRA software available from Atlassian of Sydney, Australia; etc.) that are configured to perform the functions of the workflow management systems discussed below. The workflow management system 204 is also coupled to one or more administrator devices 206 that may be provided by the IHS 100 discussed above with reference to FIG. 1. For example, the administrator device(s) 206 may include desktop computing devices, laptop/notebook computing devices, tablet computing devices, mobile phones, and/or other computing devices known in the art that are configured to perform the functions of the administrator device(s) discussed below.

The network change auditing system 202 is also coupled to a plurality of servers, any of which may be the IHS 100 discussed above with reference to FIG. 1 and/or may include some or all of the components on the IHS 100. In the specific example illustrated in FIG. 2, the servers include a file server 208, an exchange server 210, a database server 212, and a directory server 214, although one of skill in the art in possession of the present disclosure will recognize that additional, fewer, and/or other types of servers will fall within the scope of the present disclosure. The servers 208-214, either by themselves or working in combination, are configured to enable, perform, or otherwise provide workflows that may be defined by administrators and instructed by users as discussed below. Each of the file server 208, the exchange server 210, the database server 212, and the directory server 214 may include a respective agent 208a, 210a, 212a, and 214a that is configured to monitor its respective server and report activity events performed by that server in response to instructions (e.g., from users), as discussed in further detail below. The servers 208-214 may each be coupled to one or more user devices 216 that may be provided by the IHS 100 discussed above with reference to FIG. 1. For example, the user device(s) 216 may include desktop computing devices, laptop/notebook computing devices, tablet computing devices, mobile phones, and/or other computing devices known in the art that are configured to perform the functions of the user device(s) discussed below. While a specific example of the IHS network 200 is illustrated and described herein, one of skill in the art in possession of the present disclosure will recognize that a wide variety of modification to the IHS network 200 will fall within the scope of the present disclosure, including combining systems (e.g., the workflow management system 204 and the network change auditing system 202), adding or modifying systems (e.g., adding to or replacing the servers 208-214 with networking devices (e.g., switches), storage devices, and/or other network devices known in the art), and/or otherwise providing different network components known in the art.

Figure 3:
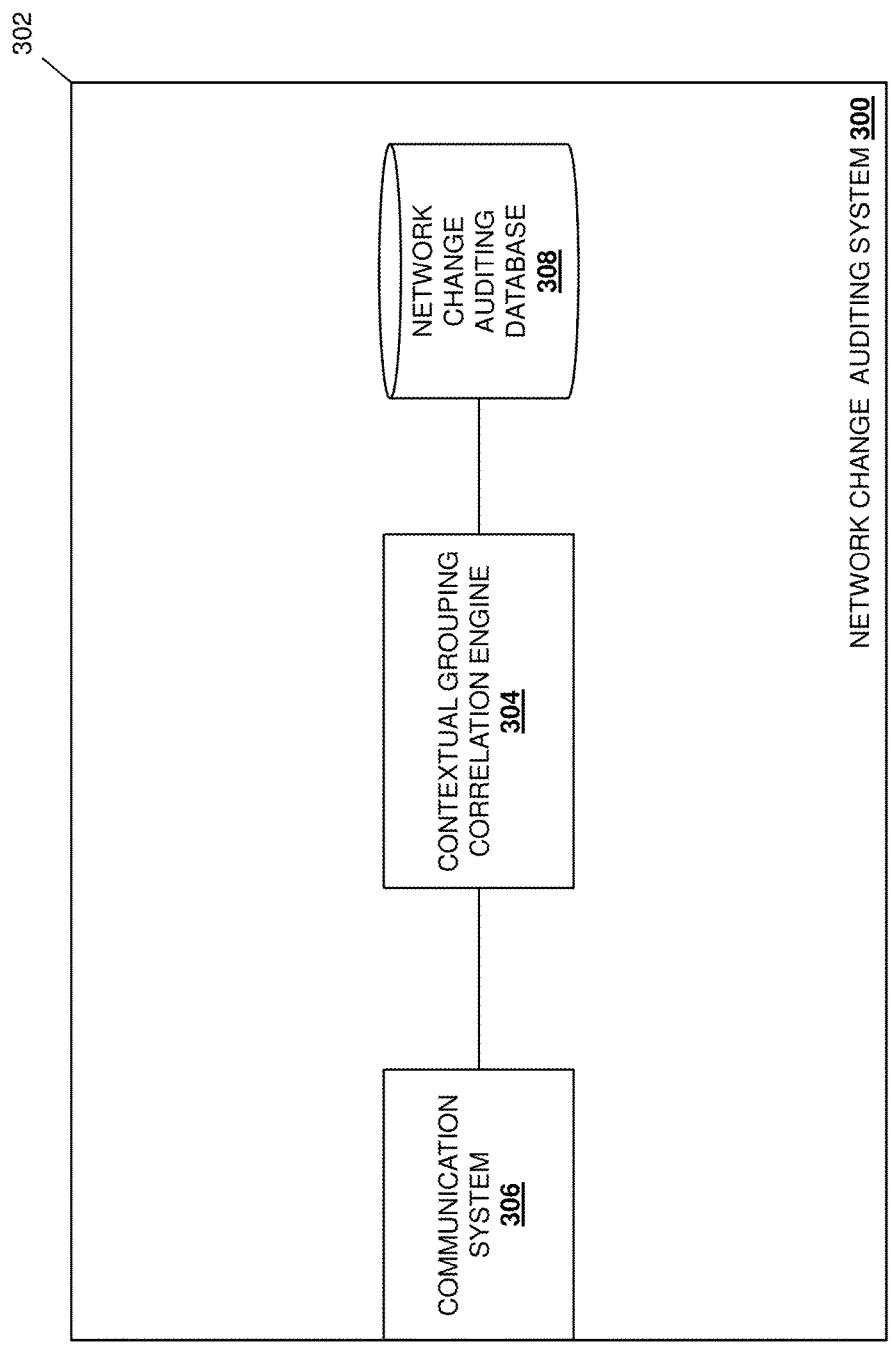
FIG. 3 is a schematic view illustrating an embodiment of a network change auditing system that may be utilized in the network of FIG. 2.

Referring now to FIG. 3, an embodiment of a network change auditing system 300 is illustrated that may be the network change auditing system 202 discussed above with reference to FIG. 2. As such, the network change auditing system 300 may be the IHS 100 discussed above with reference to FIG. 1 and/or may include some or all of the components of the IHS 100, and in specific examples may be provided by one or more servers. The network change auditing system 300 includes a chassis 302 that houses the components of the network change auditing system 300, only some of which are illustrated in FIG. 3. In an embodiment, the chassis 302 may house a processing system (not illustrated, but which may include the processor 102 discussed above with reference to FIG. 1) and a memory system (not illustrated, but which may be include the system memory 114 discussed above with reference to FIG. 1) that includes instructions that, when executed by the processing system, cause the processing system to provide a contextual grouping correlation engine 304 that is configured to perform the functions of the contextual grouping correlation engines and network change auditing systems discussed below. In a specific embodiment, the contextual grouping correlation engine 304 in the network change auditing system 300 may be provided as part of, or along with, network change auditing software such as, for example, the Change Auditor available from DELL®, Inc. of Round Rock, Tex., United States.

The chassis 302 may also house a communication system 306 that is coupled to the contextual grouping correlation engine 304 (e.g., via a coupling to the processing system) and that may include a Network Interface Controller (NIC), a wireless communication device, and/or other communication subsystems known in the art. The chassis 302 may also house a storage system (not illustrated, but which may include the storage device 108 discussed above with reference to FIG. 1) that is coupled to the contextual grouping correlation engine 304 (e.g., via a coupling between the storage system and the processing system) and that includes a network change auditing database 308 that is configured to store the information and/or data utilized by the contextual grouping correlation engine 304 as discussed below. While a specific network change auditing system 300 has been illustrated and described, one of skill in the art in possession of the present disclosure will recognize that a variety of other components may be included in the chassis 302 for performing the functions discussed below, as well as conventional functions known in the art, while remaining within the scope of the present disclosure.

Figure 4:
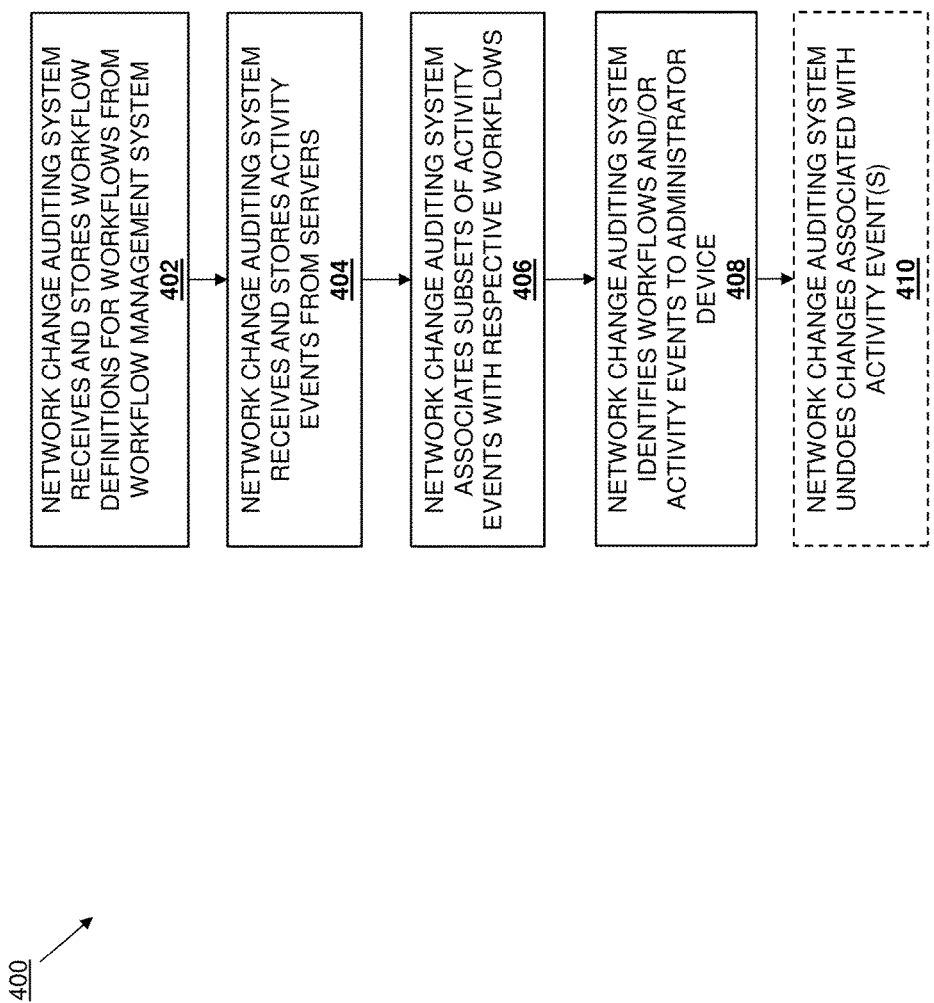
FIG. 4 is a flow chart illustrating an embodiment of a method for auditing changes in a network

Referring now to FIG. 4, an embodiment of a method 400 for auditing changes in a network is illustrated. As discussed below, the systems and methods of the present disclosure provide for the contextual grouping of activity events performed by servers with defined workflows in order to allow an administrator to identify, understand, and react to the relatively large number of changes that occur in a network. In an embodiment, such contextual grouping is accomplished by defining workflows that are performed by the servers, allowing user devices to instruct the servers to perform activity events that may or may not be defined by the workflows, and then correlating the defined workflows and the activity events. In some examples, an administrator may then identify an activity event that has occurred and receive back the workflow that includes that activity event as well as other activity events performed for that workflow, or identify a workflow and receive back the activity events performed for that workflow. In other examples, the systems and methods may identify activity events that are not identified by a workflow, and notify the administrator of those activity events. In yet other example, the system and methods may allow the administrator to undo any changes (e.g., activity events performed by the server(s)) that are defined by a workflow. As such, changes occurring in a network may be quickly and easily audited and acted upon by a network administrator.

The method 400 begins at block 402 where a network change auditing system receives and stores workflow definitions for workflows from a workflow management system. In an embodiment, administrator(s) using the administrator device(s) 206 may define workflows with one or more workflow definitions, provide those workflow definitions from the administrator device(s) 206 to the workflow management system 204, and at block 402 the network change auditing system 202 may receive those workflow definitions from the workflow management system 204 and store them. For example, the contextual grouping correlation engine 304 in the network change auditing system 202/300 may receive the workflow definitions from the workflow management system 204 through the communication system 306 and store those workflow definitions in the network change auditing database 308. The workflows and their associated workflow definitions allow the administrator to define, plan out, and/or identify the workflows that will be performed by the servers 208-214 and provided in the IHS network 200. While a specific example of the provisioning of a workflow definition for a workflow is illustrated and described below, one of skill in the art in possession of the present disclosure will recognize that workflows may be defined and provided in a variety of manners while remaining within the scope of the present disclosure.

Figure 5:
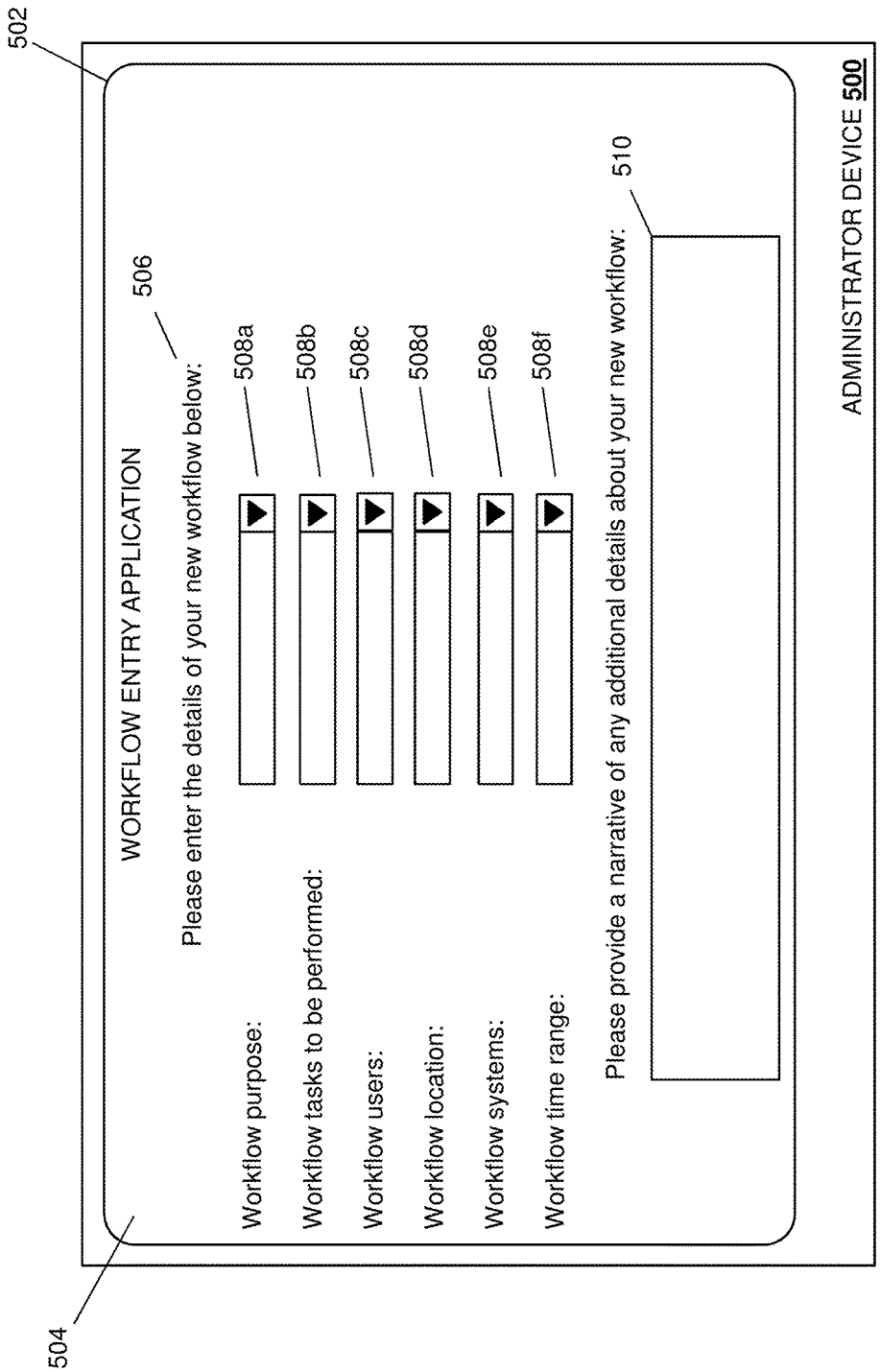
FIG. 5 is a screen shot illustrating an embodiment of a workflow entry screen displayed on an administrator device.

Referring now to FIG. 5, an embodiment of an administrator device 500, which may be one of the administrator devices 206 discussed above with reference to FIG. 2, is illustrated that includes a display 502 displaying a workflow entry screen 504. In an embodiment, the workflow entry screen 504 includes a graphical user interface generated by a workflow entry application that may be provided by the administrator device 500 and/or provided on the administrator device 500 by the workflow management system 204 (e.g., via a web-based application). In the illustrated embodiment, the workflow entry screen 504 includes instructions 506 to the administrator to define the workflow, along with a plurality of workflow definition elements that provide predetermined and selectable workflow definition information (e.g., via a "drop down" menu) that an administrator may select to provide at least some of the workflow definition. For example, a workflow purpose element 508a allows the administrator to provide predefined metadata or other definition information about a purpose for the workflow being defined, a workflow tasks element 508b allows the administrator to provide predefined metadata or other definition information about tasks that will be performed during (or that are needed to accomplish) the workflow being defined, a workflow users element 508c allows the administrator to provide predefined metadata or other definition information about users allowed or authorized to instruct the performance of the workflow being defined, a workflow location element 508d allows the administrator to provide predefined metadata or other definition information about a location (e.g., a particular server) that will provide the workflow being defined, a workflow systems element 508e allows the administrator to provide predefined metadata or other definition information about a system (e.g., a group of servers) that will provide the workflow being defined, and a workflow time range element 508f allows the administrator to provide predefined metadata or other definition information about a time range in which workflow being defined will be performed. In addition, the workflow entry screen 504 includes a narrative entry element 510 that allows the administrator to provide a textual description of the workflow to be performed.

In a specific example of a use of the workflow entry screen 504 illustrated in FIG. 5 to define "after-hours" database access and modification workflow, the administrator may use an input subsystem on the administrator device 500 (e.g., a keyboard, a pointing device, a touchscreen, etc.) to select predefined definition information using the workflow purpose element 508a to define the workflow as having a database access and modification purpose, select predefined definition information using the workflow tasks element 508b to define the workflow as including database access and modification tasks, select predefined definition information using the workflow users element 508c to define the workflow with the identities of users authorized to access and modify databases, select predefined definition information using the workflow location element 508d to define the workflow as being performed on the database server 212, select predefined definition information using the workflow systems element 508e to define the workflow as being performed by the file server 208, and select predefined definition information using the workflow time range element 508*f* to define the workflow as occurring past midnight and before 6 am (e.g., to monitor database access and modification during those times). Furthermore, the administrator may enter a textual description into the narrative entry element 510 that further defines the workflow (e.g., "this workflow is intended to capture unauthorized accesses and/or modifications to the database server during off-business hours").

At block 402, the workflow management system 204 and/or the contextual grouping correlation engine 304 in the network change auditing system 202/300 may receive the workflow definition provided via the workflow element selection and/or textual description provided on the workflow entry screen 504, and associate them with a workflow in the network change auditing database 308 (e.g., a "late night database access/modification" workflow). In addition, the workflow management system 204 and/or the contextual grouping correlation engine 304 in the network change auditing system 202/300 may receive the textual description provided in the narrative entry element 510, and analyze the textual description to determine the workflow definition for the workflow using, for example, text recognition and classification, natural language processing, and/or other techniques known in the art that operate to recognize keywords in the textual description to identify and define the workflow. While the selection of predefined workflow definitions via the elements 508*a-f* and the textual description of workflow definitions via the element 510 have been described as being used together, one of skill in the art in possession of the present disclosure will recognize that either may be utilized by themselves to provide a workflow definition for a workflow while remaining within the scope of the present disclosure. Furthermore, while specific categories have been provided and described as allowing for the selection of workflow definition information via the elements 508*a-f*, one of skill in the art in possession of the present disclosure will recognize that any other workflow definition information may be provided via similar selectable elements while remaining within the scope of the present disclosure, and the analysis of any textual description provided in the element 510 may detect any workflow definition information provided by an administrator to define a workflow while remaining within the scope of the present disclosure.

The method 400 then proceeds to block 404 where the network change auditing system receives and stores activity events from servers. In an embodiment, user(s) using the user device(s) 216 may provide requests, responses, and/or other instructions to any or all of the servers 208-214 that result in activity events being performed by or otherwise occurring on those server(s), and at block 402 the network change auditing system 202 may receive and store those activity events from the server(s) 208-214. For example, the contextual grouping correlation engine 304 in the network change auditing system 202/300 may receive the activity events occurring on any particular server from the agents 208*a*-214*a* operating on those respective servers 208-214 through the communication system 306 and store those activity events in the network change auditing database 308. As such, the agents 208*a*-214*a* in the respective servers 208-214 may operate to monitor and report any activity events resulting from instructions provided by any of the user device(s) 216, along with any metadata about those activity events (e.g., the identity of the user that provided the instruction resulting in the activity event, the location of the activity event, the time at which the activity event occurred, etc.) In a specific example, a user may use one of the user devices 216 to access the database server 212 and modify data stored in that database server 212 (e.g., file access, file modification, file creation, file deletion, etc.), and the agent 212*a* may detect that access and data modification, and report that access and data modification along with any other relevant metadata describing that access and data modification to the contextual grouping correlation engine 304 in the network change auditing system 202/300. As such, one of skill in the art in possession of the present disclosure will recognize that at block 404, any agents operating on any servers in the IHS network 200 may identify and collect activity events as they are performed, and report those activity events to the network change auditing system 202.

The method 400 then proceeds to block 406 where the network change auditing system associates subsets of the activity events with respective workflows. In an embodiment, at block 406, the contextual grouping correlation engine 304 in the network change auditing system 300 operates to associate subsets of the activity events received at block 404 with the workflows defined by the workflow definitions received at block 402. For example, the contextual grouping correlation engine 304 may operate at block 406 to use the workflow definition information for any of the workflows stored in the network change auditing database 306 to determine subsets of the activity events that are defined in that workflow definition information (e.g., via the information and/or metadata associated with those activity events). In a specific example, an activity event may include information and/or metadata that describes the identity of a user that provided the instruction that resulted in the activity event, the location (e.g., the server) that performed the activity event, and/or the time the activity occurred, and that information and/or metadata may be matched to a workflow definition that includes that workflow user, that workflow location, and a workflow time range that includes that time. As such, for each activity event received at block 404, the contextual grouping correlation engine 304 may associate that activity event with at least one workflow in the network change auditing database 308, or determine that the received activity event included information and/or metadata that is not defined by any existing workflow definitions.

The method 400 then proceeds to block 408 where the network change auditing system identifies workflows and/or activity events to an administrator device. As discussed below, the association of the activity events performed by or occurring in the servers 208-2140 with the workflows defined through the administrator device 206 allows the network change auditing system 202 to provide a variety of information about any activity event and/or workflow performed in the IHS network 200 and/or identified by an administrator. While a few specific examples of the identification of activity events and/or workflows are provided below, one of skill in the art in possession of the present disclosure will recognize that correlation and contextual grouping of activity events and workflows allows an administrator to quickly and easily find out almost any information desired about a change that has occurred in the IHS network 200, and thus the identification of activity events, workflows, and/or related information other than that explicitly illustrated and described below will fall within the scope of the present disclosure.

Figure 6:
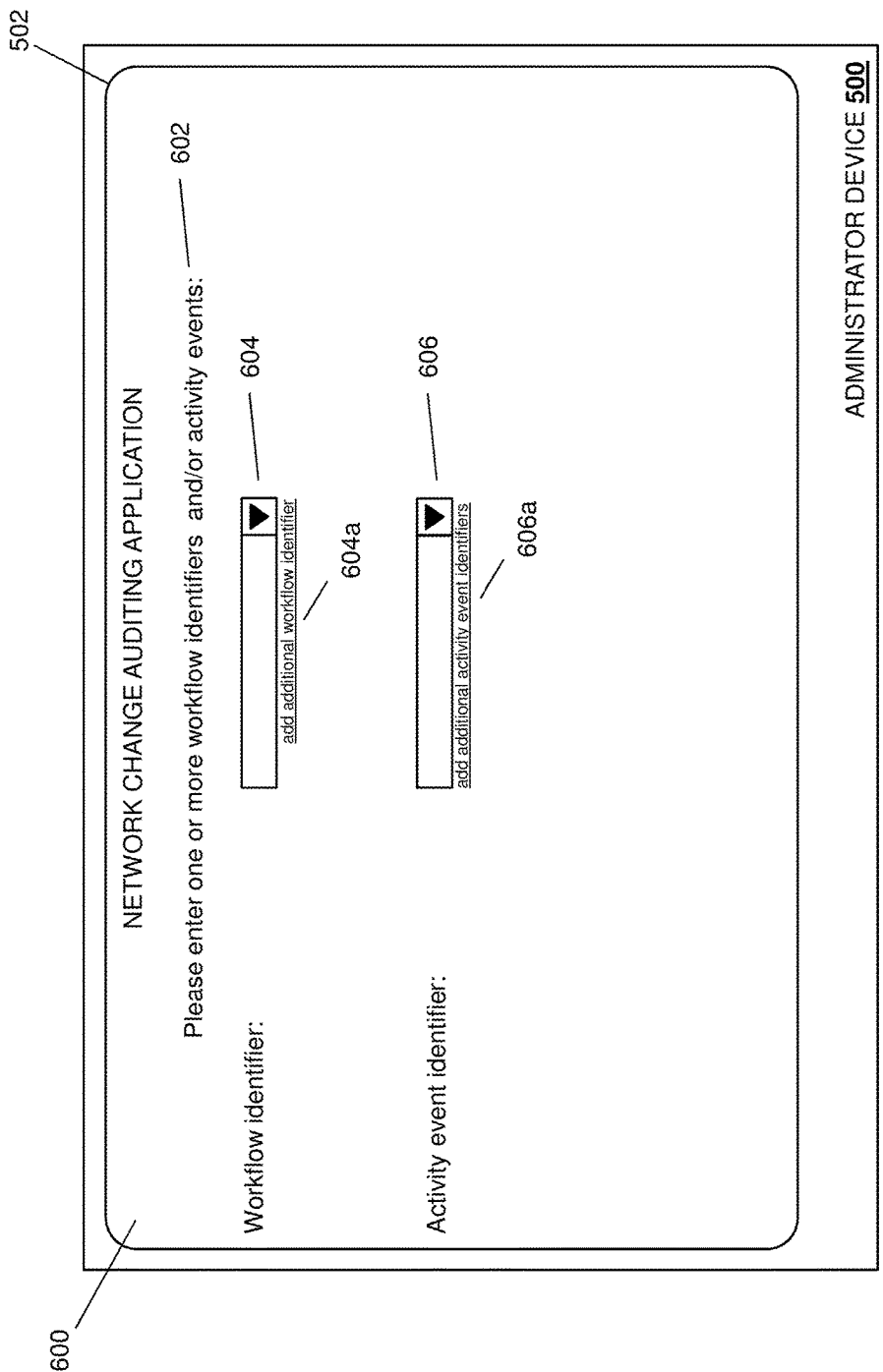
FIG. 6 is a screen shot illustrating an embodiment of a network change auditing screen displayed on an administrator device.

Referring now to FIG. 6, an embodiment of the administrator device 500 is illustrated that includes the display 502 displaying a network change auditing screen 600. In an embodiment, the network change auditing screen 600 include a graphical user interface generated by a network change auditing application that may be provided by the administrator device 500 and/or provided on the administrator device 500 by the network change auditing system 202 (e.g., via a web-based application). In the illustrated embodiment, the network change auditing screen 600 includes instructions 602 to the administrator to enter workflow identifier(s) and/or activity event(s), along with a workflow identifier element 604 that provides predetermined and selectable workflow identifiers (e.g., via a "drop down" menu) that an administrator may use to provide a workflow identifier, and an activity event identifier element 606 that provides predetermined and selectable activity events (e.g., via a "drop down" menu) that an administrator may use to identify an activity event. For example, a workflow identifier element 604 allows the administrator to identify a workflow, and is associated with an additional workflow identifier link 604a that the administrator may select to be provided with additional workflow identifier elements that are substantially similar to the workflow identifier element 604. Similarly, an activity event identifier element 606 allows the administrator to identify an activity event, and is associated with an additional activity event identifier link 606a that the administrator may select to be provided with additional activity event elements that are substantially similar to the activity event element 606. One of skill in the art in possession of the present disclosure will recognize that the network change auditing screen 600 provides only one example of how an administrator may identify workflows and/or activity events, and other techniques (e.g., textual descriptions similar to those discussed above, links on activity event reporting screens, etc.) will fall within the scope of the present disclosure as well.

Figure 7:
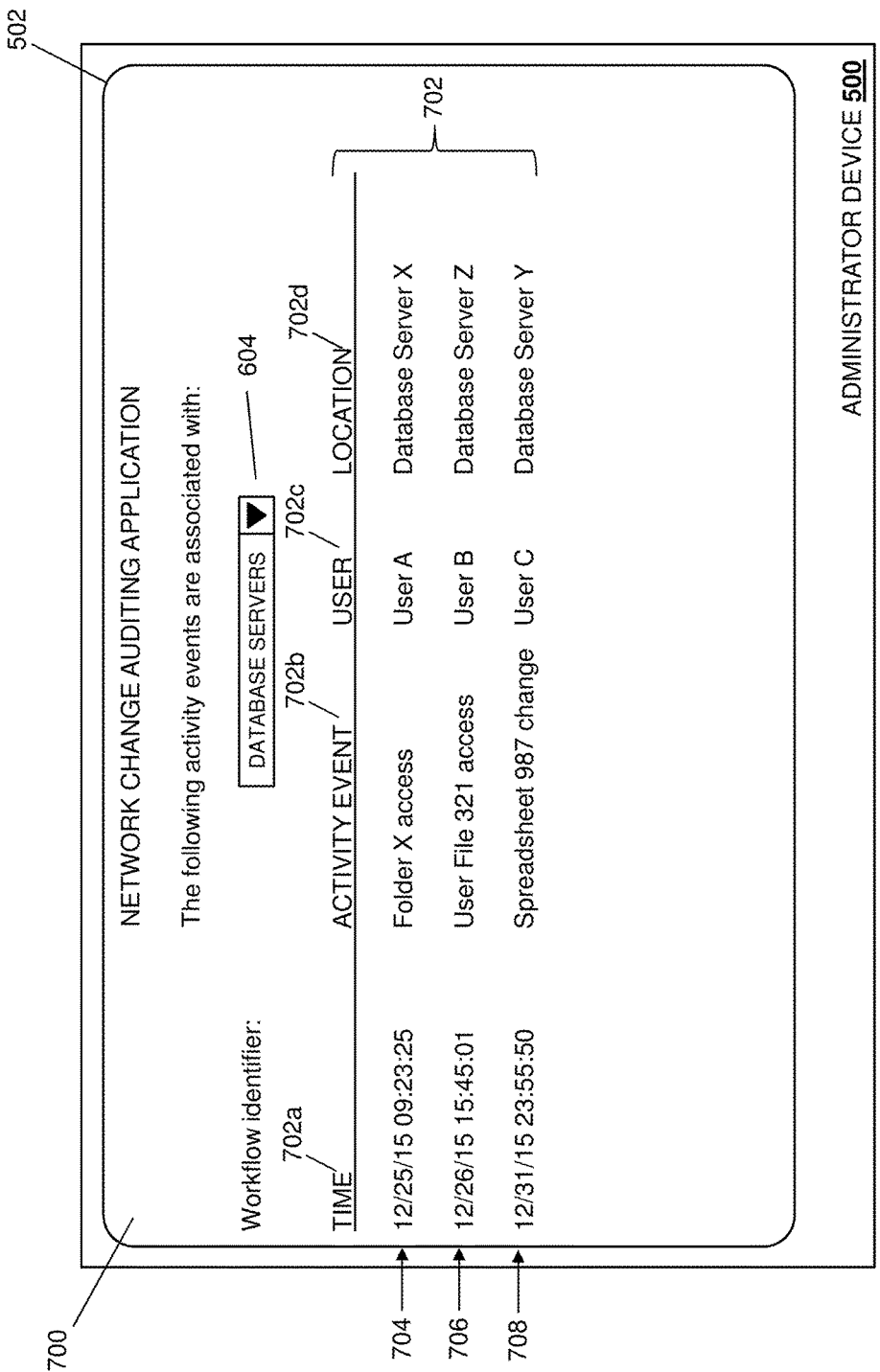
FIG. 7 is a screen shot illustrating an embodiment of an auditing event information screen displayed on an administrator device.

Referring now to FIG. 7, an embodiment of the administrator device 500 is illustrated that includes the display 502 displaying an auditing event information screen 700. In an embodiment, the auditing event information screen 700 include a graphical user interface generated by a network change auditing application that may be provided by the administrator device 500 and/or provided on the administrator device 500 by the network change auditing system 202 (e.g., via a web-based application). In the illustrated embodiment, the auditing event information screen 700 is provided on the administrator device 500 following the selection of a workflow identifier (e.g., the "DATABASE SERVER" workflow identifier in the illustrated example) via the workflow identifier element 604, and includes an activity event table 702 that provides information about the activity events associated with the selected workflow identifier. For example, the activity event table 702 includes a time column 702a, an activity event column 702b, a user column 702c, and a location column 702d, along with a plurality of rows 704, 706, and 708 that each provide information about a particular activity event associated with the selected workflow identifier. In the illustrated example, for the workflow identifier "DATABASE SERVERS", the row 704 details an activity event for "Folder X access" that occurred at Dec. 25, 2015 at 9:23 am, was instructed by a user A, and that was performed on database server X; the row 706 details an activity event for "User File 321 access" that occurred at Dec. 26, 2015 at 3:45 pm, was instructed by a user B, and that was performed on database server Z; and the row 708 details an activity event for "Spreadsheet 987 change" that occurred at Dec. 31, 2015 at 11:55 pm, was instructed by a user C, and that was performed on database server Y. Thus, for any workflow defined by the administrator and identified on the network change auditing screen 600, each activity event that has been received and associated with that workflow may be provided for display on the administrator device 500. In addition, other functionality may be provided on the auditing event information screen 700 that allows the administrator to search through the returned activity events, select an activity event to receive more information about that activity event, retrieve other similar activity events, and/or perform any other action that would allow the administrator to determine why the activity event was performed.

Figure 8:
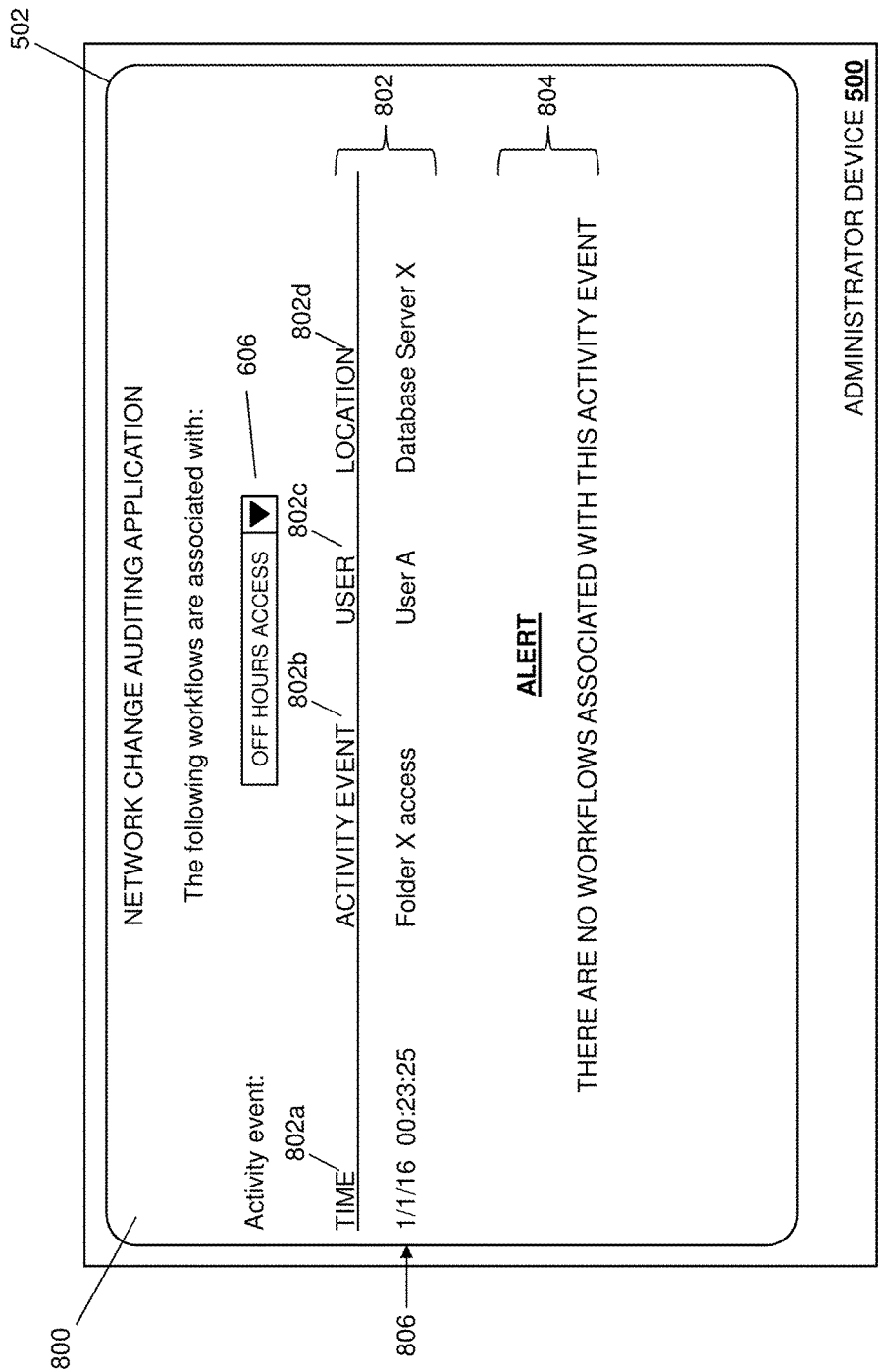
FIG. 8 is a screen shot illustrating an embodiment of a workflow information screen displayed on an administrator device.

Referring now to FIG. 8, an embodiment of the administrator device 500 is illustrated that includes the display 502 displaying a workflow information screen 800. In an embodiment, the workflow information screen 800 include a graphical user interface generated by a network change auditing application that may be provided by the administrator device 500 and/or provided on the administrator device 500 by the network change auditing system 202 (e.g., via a web-based application). In the illustrated embodiment, the workflow information screen 800 is provided on the administrator device 500 following the selection of an activity event identifier (e.g., the "OFF HOURS ACCESS" activity event identifier in the illustrated example) via the activity event identifier element 606, and includes an activity event table 802 that provides information about the activity events associated with the selected activity event identifier, and a workflow section 804 that may provide any workflows that are associated with the activity events associated with the selected activity event identifier. For example, the activity event table 802 includes a time column 802a, an activity event column 802b, a user column 802c, and a location column 802d, along with a row 806 that provides information about a particular activity event associated with the selected activity event identifier. In the illustrated example, for the activity event identifier "OFF HOURS ACCESS", the row 806 details an activity event for "Folder X access" that occurred at Jan. 1, 2016 at 12:23 am, was instructed by a user A, and that was performed on database server X. Furthermore, the workflow section 804 provides an alert that the activity event detailed in row 806 is not associated with any defined workflows.

The workflow information screen 800 provides an example of the identification of activity events that are not defined by workflows in the IHS network 200, and may be provided to help reduce auditing "noise" in network change auditing systems. For example, screens like the workflow information screen 800 may be utilized to examine all of the activity events that are not associated with defined workflows (i.e., planned work in the IHS network 200) and thus identify unplanned activity events and/or changes that may be of interest to an administrator, providing for IHS network anomaly identification and detection (e.g., a user is accessing data that they should not be accessing). However, in other embodiments, the workflow information screen 800 may return one or more workflows that include the activity event identified by the administrator in the activity event identifier element 606 or included in the activity event table 802. Thus, for any activity event provided by the administrator and identified on the network change auditing screen 600, workflow(s) and related activity event(s) that have been received and associated with those workflow(s) may be provided for display on the administrator device. One of skill in the art in possession of the present disclosure will recognize that any workflow returned in response to an identified activity event may include one or more reasons why that workflow was performed, which may be utilized by an administrator to determine why the activity event was performed (as contrasted with such an activity event, by itself, having no context in conventional systems). Other functionality may be provided on the auditing event information screen 700 that allows the administrator to search through the returned activity events or workflows, select an activity event or workflow to receive more information about that activity event or workflow, retrieve other similar activity events or workflows, and/or perform any other action that would allow the administrator to determine why the activity event or workflow was performed.

One of skill in the art in possession of the present disclosure will appreciate that the grouping of the activity events and the workflows also allows the network change auditing system 202/300 to suggest activity events and/or workflows that may be related to an activity event or workflow of interest, and the two-way binding of activity events and workflows allows information about either to be returned when the other is identified by the administrator. The ability to examine an activity event that, by itself conventionally does not have context, to retrieve contextual information about that activity event allows the administrator to determine why that activity event occurred (via the associated activity events and workflows), which can provide substantial benefits when examining activity events related to security (e.g., the database access discussed above), compliance (e.g., Health Insurance Portability and Accountability Act (HIPAA) issues), and/or other network changes that may need to be investigated by an administrator. As such, while a few examples have been provided, it should be appreciated that the techniques described herein will be beneficial to investigate any change that occurs in the IHS network, and thus the identification of those changes will fall within the scope of the present disclosure as well.

Figure 9:
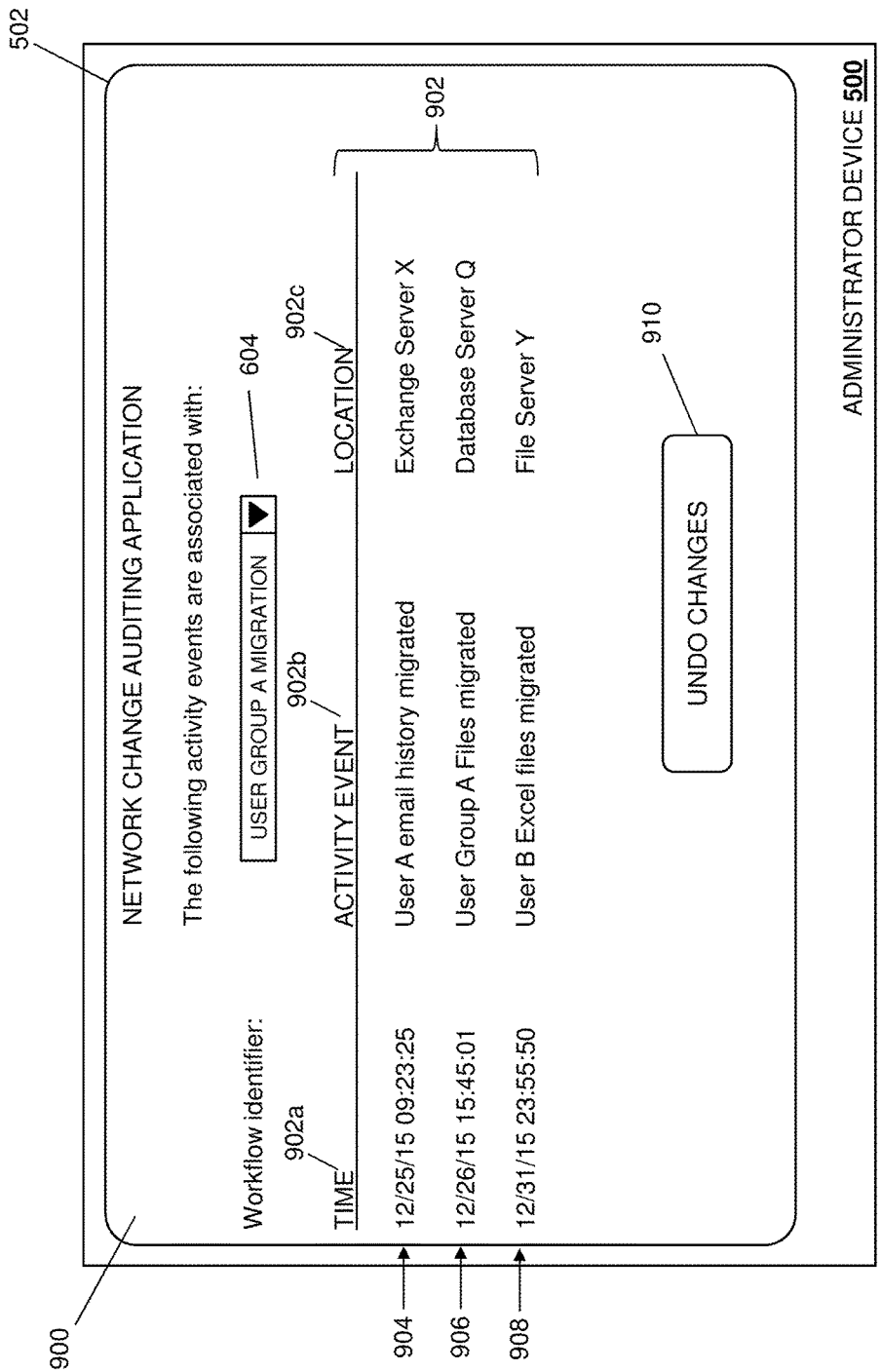
FIG. 9 is a screen shot illustrating an embodiment of an auditing event information screen displayed on an administrator device.

The method 400 may then proceed to optional block 410 where the network change auditing system may undo changes associated with activity events. Referring now to FIG. 9, an embodiment of the administrator device 500 is illustrated that includes the display 502 displaying an auditing event information screen 900. In an embodiment, the auditing event information screen 900 include a graphical user interface generated by a network change auditing application that may be provided by the administrator device 500 and/or provided on the administrator device 500 by the network change auditing system 202 (e.g., via a web-based application). In the illustrated embodiment, the auditing event information screen 900 is provided on the administrator device 500 following the selection of a workflow identifier (e.g., the "USER GROUP A MIGRATION" workflow identifier in the illustrated example) via the workflow identifier element 604, and includes an activity event table 902 that provides information about the activity events associated with the selected workflow identifier. For example, the activity event table 902 includes a time column 902*a*, an activity event column 902*b*, and a location column 902C, along with a plurality of rows 904, 906, and 908 that each provide information about a particular activity event associated with the selected workflow identifier. In the illustrated example, for the workflow identifier "USER GROUP A MIGRATION", the row 904 details an activity event for "User A email history migrated" that occurred at Dec. 25, 2015 at 9:23 am and that was performed on exchange server X; the row 906 details an activity event for "User Group A File migrated" that occurred at Dec. 26, 2015 at 3:45 pm and that was performed on database server Q; and the row 908 details an activity event for "User B Excel files migrated" that occurred at Dec. 31, 2015 at 11:55 pm and that was performed on file server Y. The auditing event information screen also includes an undo changes element 910.

Figure 10:
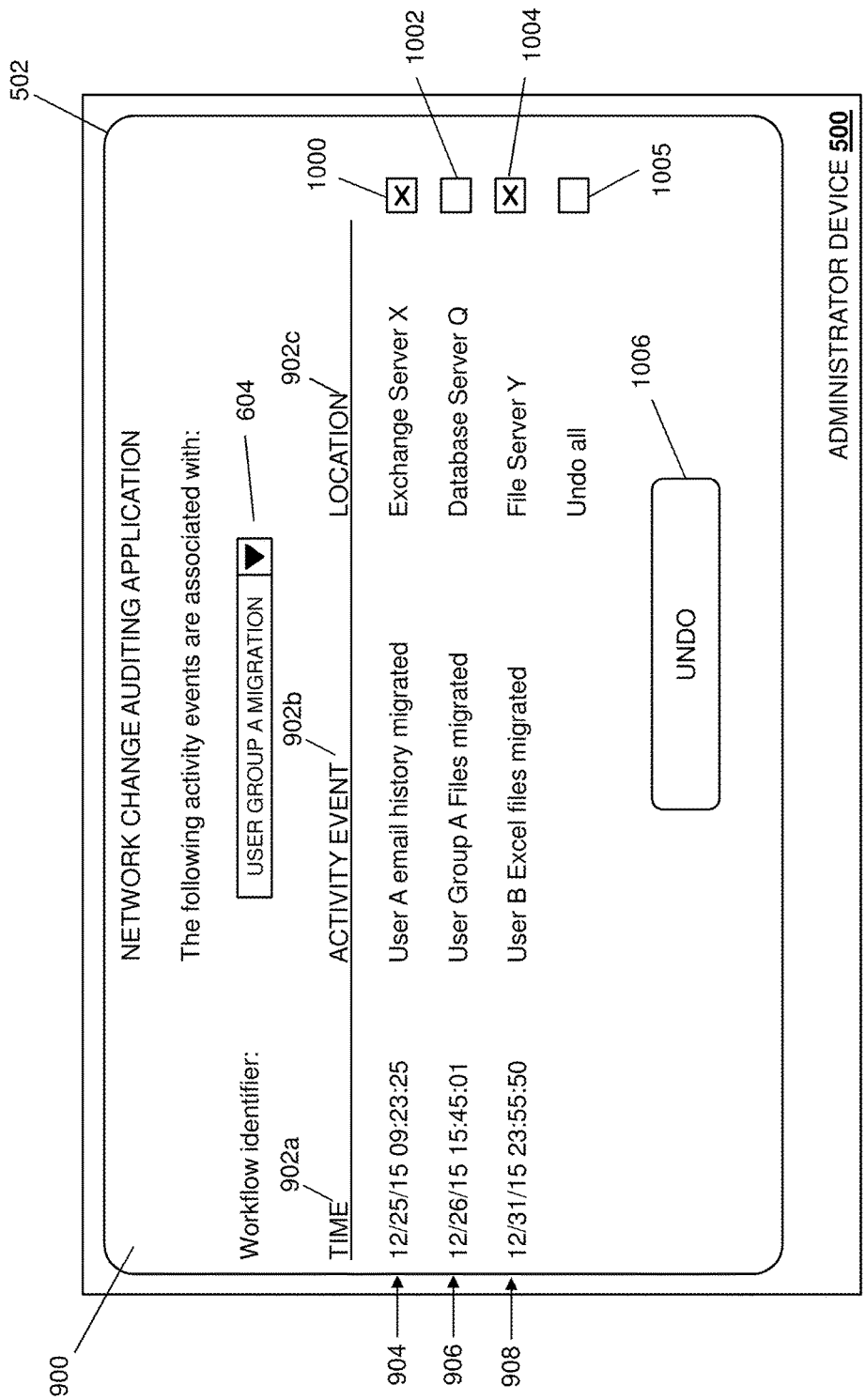
FIG. 10 is a screen shot illustrating an embodiment of an undo changes screen displayed on an administrator device.

Referring now to FIG. 10, at optional block 410, the administrator may select the undo change element 910 (e.g., via an input device on the administrator device 500) in order to be provided a plurality of undo change elements 1000, 1002, and 1004 adjacent the respective rows 904, 906, and 908, along with an undo all element 1005 and an undo element 1006. In an embodiment of optional block 410, the user may select any of the undo change elements 1000-1005 (e.g., undo change elements 1000 and 1004 are selected in the illustrated embodiment), followed by the selection of the undo element 1006, in order to provide the network change auditing system 202 an instruction to reverse the instructions provided by the user(s) that caused the activity events associated with the selected undo change elements (e.g., the activity events identified by rows 904 and 908 in the illustrated embodiment.) In response to receiving the instruction, the network change auditing system 202 may send cause the instructions provided on the server(s) that performed the associated activity events to be reversed (e.g., by returning the "User A email history" that was migrated by Exchange Server X as identified by row 904 back to its original location, and by returning the "User B Excel files" that were migrated by File Server Y as identified by row 908 back to its original location). Thus, for any workflow defined by the administrator and identified on the network change auditing screen 600, each activity event that has been received and associated with that workflow may be provided for display on the administrator device, and may be undone one or more simply instructions (e.g., the activity-event-by-activity-event selection as illustrated, all at once using the undo all element 1005, etc.) Such ability to undo or "roll back" one or more activity events associated with a workflow may provide significant benefits when activity events are mistakenly performed due to an erroneous instruction from a user device (e.g., to perform the migration illustrated and discussed above).

Thus, systems and methods have been described that allow an administrator of an IHS network that is dealing with a large (and ever increasing) store of change data to determine why associated changes occurred, whether those changes were planned, and/or find out any other information about a network change in a time efficient manner by contextually grouping activity events that result in the changes with workflow definitions for workflows that are performed in the network and that provide a wealth of knowledge as to why the activity event was performed and thus why the change occurred. The systems and methods of the present disclosure allow an administrator to identify a workflow and receive all of the activity events performed for that workflow, identify an activity event and receive the workflow with which it is associated along with other related activity events, receive notifications of activity events that are not defined by a workflow, undo changes associated with any or all of the activity events returned for a defined workflow, and/or provide a variety of other benefits that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system (IHS) network, comprising:
   a workflow management system that is configured to couple to an administrator device;
   a plurality of servers that are configured to couple to a user device; and
   a network change auditing system that is coupled to the workflow management system and the plurality of servers, wherein the network change auditing system is configured to:
      receive and store a plurality of workflow definitions from the workflow management system, wherein each of the plurality of workflow definitions are associated with a respective workflow provided by at least one of the plurality of servers;
      receive and store a plurality of activity events from the at least one of the plurality of servers, where each activity event is associated with instructions provided by the user device to at least one of the plurality of servers;
      associate a first subset of the plurality of activity events with a first workflow based on the first subset of the plurality of activity events being defined by a first workflow definition of the plurality of workflow definitions;
      receive an identification of a first activity event in the first subset of the plurality of activity events from the administrator device and, in response, provide an identification of the first workflow and at least one second activity event in the first subset of the plurality of activity events for display on the administrator device;
      associate a second subset of the plurality of activity events with a second workflow based on the second subset of the plurality of activity events being defined by a second workflow definition of the plurality of workflow definitions; and
      receive a request to undo at least one of the second subset of the plurality of activity events from the administrator device and, in response, reverse the instructions that were provided by the user device to the at least one of the plurality of servers to produce the at least one of the second subset of activity events.

2. The IHS network of claim 1, wherein the network change auditing system is configured to:
   associate a third subset of the plurality of activity events with a third workflow based on the third subset of the plurality of activity events being defined by a third workflow definition of the plurality of workflow definitions; and
   receive an identification of the third workflow from the administrator device and, in response, provide an identification of each of the third subset of the plurality of activity events for display on the administrator device.

3. The IHS network of claim 1, wherein the network change auditing system is configured to:
   determine a third subset of the plurality of activity events is not associated with any workflow; and
   provide an identification of the third subset of the plurality of activity events for display on the administrator device.

4. The IHS network of claim 1, wherein the first workflow definition includes at least one workflow location, at least one workflow user, and at least one workflow time range.

5. The IHS network of claim 1, wherein the network change auditing system is configured to:
   receive a textual description of the first workflow and, in response, analyze the textual description to determine the first workflow definition.

6. The IHS network of claim 1, wherein the workflow management system is configured to:
   receive the plurality of workflow definitions from the administrator device; and
   provide the plurality of workflow definitions to the network change auditing system.

7. A network change auditing system, comprising:
   a communication system that is coupled to a plurality of servers;
   a database storing a plurality of workflow definitions that are each associated with a respective workflow provided by at least one of the plurality of servers;
   a processing system coupled to the database; and
   a memory system that is coupled to the processing system and the communication system, wherein the memory system includes instructions that, when executed by the processing system, cause the processing system to provide a contextual grouping correlation engine that is configured to:
      receive and store a plurality of activity events from the at least one of the plurality of servers through the communication system, where each activity event is associated with instructions provided by at least one user device to at least one of the plurality of servers;
      associate a first subset of the plurality of activity events with a first workflow based on the first subset of the plurality of activity events being defined by a first workflow definition of the plurality of workflow definitions;
      receive an identification of a first activity event in the first subset of the plurality of activity events from an administrator device through the communication system and, in response, provide an identification of the first workflow and at least one second activity event in the first subset of the plurality of activity events through the communication system for display on the administrator device;
      associate a second subset of the plurality of activity events with a second workflow based on the second subset of the plurality of activity events being defined by a second workflow definition of the plurality of workflow definitions; and
      receive a request to undo at least one of the second subset of the plurality of activity events from the administrator device through the communication system and, in response, reverse the instructions that were provided by the at least one user device to the at least one of the plurality of servers to produce the at least one of the second subset of activity events.

8. The system of claim 7, wherein the contextual grouping correlation engine is configured to:
   associate a third subset of the plurality of activity events with a third workflow based on the third subset of the plurality of activity events being defined by a third workflow definition of the plurality of workflow definitions; and
   receive an identification of the third workflow from the administrator device through the communication system and, in response, provide an identification of each of the third subset of the plurality of activity events for display on the administrator device.

9. The system of claim 7, wherein the contextual grouping correlation engine is configured to:
- determine a third subset of the plurality of activity events is not associated with any workflow; and
- provide an identification of the third subset of the plurality of activity events through the communication system for display on the administrator device.

10. The system of claim 7, wherein the first workflow definition includes at least one workflow location, at least one workflow user, and at least one workflow time range.

11. The system of claim 7, wherein the contextual grouping correlation engine is configured to:
- receive a textual description of the first workflow and, in response, analyze the textual description to determine the first workflow definition.

12. A method for auditing changes in a network, comprising:
- receiving and storing, by a network change auditing system, a plurality of workflow definitions from a workflow management system, wherein each of the plurality of workflow definitions are associated with a respective workflow provided by at least one of a plurality of servers;
- receiving and storing, by the network change auditing system, a plurality of activity events from the at least one of the plurality of servers, where each activity event is associated with instructions provided by a user device to at least one of the plurality of servers;
- associating, by the network change auditing system, a first subset of the plurality of activity events with a first workflow based on the first subset of the plurality of activity events being defined by a first workflow definition of the plurality of workflow definitions;
- receiving, by the network change auditing system, an identification of a first activity event in the first subset of the plurality of activity events from an administrator device and, in response, providing an identification of the first workflow and at least one second activity event in the first subset of the plurality of activity events for display on the administrator device;
- associating, by the network change auditing system, a second subset of the plurality of activity events with a second workflow based on the second subset of the plurality of activity events being defined by a second workflow definition of the plurality of workflow definitions; and
- receiving, by the network change auditing system, a request to undo at least one of the second subset of the plurality of activity events from the administrator device and, in response, reversing the instructions that were provided by the user device to the at least one of the plurality of servers to produce the at least one of the second subset of activity events.

13. The method of claim 12, further comprising:
- associating, by the network change auditing system, a third subset of the plurality of activity events with a third workflow based on the third subset of the plurality of activity events being defined by a third workflow definition of the plurality of workflow definitions; and
- receiving, by the network change auditing system, an identification of the third workflow from the administrator device and, in response, providing an identification of each of the third subset of the plurality of activity events for display on the administrator device.

14. The method of claim 12, further comprising:
- determining, by the network change auditing system, a third subset of the plurality of activity events is not associated with any workflow; and
- providing, by the network change auditing system, an identification of the third subset of the plurality of activity events for display on the administrator device.

15. The method of claim 12, wherein the first workflow definition includes at least one workflow location, at least one workflow user, and at least one workflow time range.

16. The method of claim 12, further comprising:
- receiving, by the network change auditing system, a textual description of the first workflow and, in response, analyzing the textual description to determine the first workflow definition.

17. The method of claim 12, further comprising:
- receiving, by the network change auditing system, the plurality of workflow definitions from the administrator device; and
- providing, by the network change auditing system, the plurality of workflow definitions to the network change auditing system.

* * * * *